(12) United States Patent
Soderquist

(10) Patent No.: US 7,654,563 B2
(45) Date of Patent: Feb. 2, 2010

(54) COVER TO WHEEL ATTACHMENT METHOD FOR IMPROVED GAP CONTROL

(75) Inventor: Quin Soderquist, South Weber, UT (US)

(73) Assignee: Autoliv ASP, Inc., Ogden, UT (US)

( * ) Notice: Subject to any disclaimer, the term of this patent is extended or adjusted under 35 U.S.C. 154(b) by 125 days.

(21) Appl. No.: 12/080,488

(22) Filed: Apr. 2, 2008

(65) Prior Publication Data

US 2009/0250908 A1    Oct. 8, 2009

(51) Int. Cl.
*B60R 21/16* (2006.01)
(52) U.S. Cl. ............................................. 280/731
(58) Field of Classification Search ............. 280/731, 280/728.3
See application file for complete search history.

(56) References Cited

U.S. PATENT DOCUMENTS

| | | | | |
|---|---|---|---|---|
| 5,584,503 A | * | 12/1996 | Lutz | 280/731 |
| 5,676,396 A | * | 10/1997 | Fohl | 280/731 |
| 5,765,865 A | * | 6/1998 | Nagata et al. | 280/731 |
| 5,787,762 A | | 8/1998 | Sakurai et al. | |
| 5,997,031 A | | 12/1999 | Heilig | |
| 7,059,631 B2 | | 6/2006 | Schorle et al. | |
| 2005/0236820 A1 | | 10/2005 | Amamori | |
| 2007/0210562 A1 | | 9/2007 | Vigeant et al. | |

* cited by examiner

*Primary Examiner*—Faye M. Fleming
(74) *Attorney, Agent, or Firm*—Sally J Brown; Madson IP, P.C.

(57) ABSTRACT

A steering wheel assembly that receives an airbag may include a steering wheel framework. This framework may include a back cover and a first attachment feature. The steering wheel assembly may include an airbag cover having a second attachment feature for engaging the first attachment feature to directly attach the airbag cover to the steering wheel framework. This attachment may be accomplished without the use of an airbag housing. In some situations, the framework further includes an armature. The first attachment feature is positioned either on the armature or on the back cover.

18 Claims, 6 Drawing Sheets

COVER TO WHEEL ATTACHMENT METHOD FOR IMPROVED GAP CONTROL

BACKGROUND OF THE INVENTION

For many years, motor vehicles have been equipped with airbags and airbag systems. These airbag systems are designed to inflate one or more airbags in the event of an accident or crash. These inflated airbags become positioned on the interior of the vehicle such that the occupant impacts the airbag rather than the steering wheel, the dashboard, or other portions of the vehicle interior.

In order to protect a vehicle driver from frontal impact, an airbag is often positioned as part of the vehicle's steering wheel. These systems are referred to as "steering wheel" airbag systems or "driver" airbag systems. The steering wheel airbag system will generally position the airbag at or near the center or hub of the steering wheel. Steering wheel spokes generally will connect the steering wheel hub to the outer rim of the steering wheel. Steering wheel airbag systems are designed such that when deployed, the airbag will generally cover all portions of the steering wheel, including the hub, the spokes, and the outer rim. When the steering wheel is covered by the inflated airbag, the driver will be prevented from harmfully impacting the steering wheel.

Steering wheel airbag systems generally comprise an airbag cover and a housing that houses the uninflated airbag. The cover, the housing, and the enclosed uninflated airbag are generally referred to as the "airbag module." The airbag cover is generally attached directly to the housing. The airbag module is attached to the steering wheel via attachment features. These attachment features can be part of the housing or a separate component attached to the housing. The cover includes a tear seam and is positioned between the airbag and the vehicle seat. During an accident or crash, the cover will tear along the tear seam to allow the inflated airbag to become positioned in the vehicle interior.

FIG. 1 is a representation of the prior art representation of a steering wheel assembly 10. Specifically, the steering wheel assembly 10 includes an airbag 12, an airbag cover 14, and an inflator 22. The airbag 12 and the cover 14 are attached to an airbag housing 18, which is generally a metal plate or ring. The airbag 12 and housing 18 may also be attached to an inflator 22. The housing 18 is secured to an attach plate 19 which is then secured to the steering wheel armature 20.

One of the challenges in designing these steering wheel airbag modules is to position the airbag module as part of the steering wheel, yet still create a visually appealing steering wheel system. For example, when a steering wheel airbag module is positioned proximate the center or hub of the wheel, a gap or opening may be formed between the edge of the airbag module and the steering wheel spoke. Consumers generally do not prefer to see large gaps between the airbag module and other portions of the steering wheel system. For this reason, vehicle manufactures consistently seek new designs for steering wheel airbag systems that can control or eliminate the gap between the spokes and the airbag module.

One method that has been designed to reduce the gap between the airbag module and the steering wheel spoke is to construct the airbag cover with overlaps that cover/hide the gap. Unfortunately, this method slightly raises the overall costs of producing the airbag cover in that it requires that the cover include additional material. However, if the cover overlaps to cover the gap, the resulting structure may not be very cosmetically appealing to consumers.

Some manufacturers have even attempted to integrally mold the steering wheel hub to the cover, thereby providing a seamless interface between the airbag module and the steering wheel spokes. This method can eliminate all issues regarding the gap. At the same time, this method is very expensive and may require the use of a more expensive material for making the cover. (However, this method may be used when the manufacturer wanted a perfect gap—i.e., no gap). This integrally molded system may further require expensive methods for attaching the airbag module to the steering wheel. The increased costs associated with the integrally molded steering wheel systems means that such systems are generally disfavored.

More recently, vehicle manufacturers have desired less expensive means for controlling the size of the gap between the steering wheel spokes and the airbag module. Some of these recent designs are referred to as having a "floating" airbag cover because the airbag cover is loosely and moveably attached to the housing These floating covers provide adequate control of the gap between the airbag module and the spokes. At the same time, the floating covers can be expensive to manufacture and may require special, expensive hardware to properly connect and/or position the cover. These types of specially-designed components add to the cost, weight and complexity of the airbag module.

Based upon the foregoing, it is clear that a need exists for a new type of steering wheel airbag module that adequately controls the gap between the spokes and airbag module, but is easy to install and inexpensive to manufacture. Such a device is disclosed herein.

BRIEF SUMMARY OF THE INVENTION

A steering wheel assembly for receiving an airbag is disclosed. The assembly comprises a steering wheel framework. The framework comprises an armature, a back cover, and a first attachment feature. An airbag cover is also added to the assembly. The airbag cover has a second attachment feature for engaging the first attachment feature to directly attach the steering wheel framework to the airbag cover without the use of an airbag housing. In some embodiments, the first attachment feature comprises hooks and the second attachment feature comprises openings, wherein the airbag cover is attached by passing the hooks through the openings. The first attachment feature may be positioned either on the back cover or on the armature. Other embodiments may be made in which the attachment features on the steering wheel framework are on both the back cover and the armature.

In some embodiments, the first attachment feature is a first opening and the second attachment feature is a second opening, and wherein the assembly further comprises a connector strip having one or more tabs, wherein the tabs are passed through the first opening and the second opening.

In some embodiments, the first attachment feature comprises a slot and the second attachment feature comprises a tab, wherein the tab is sized such that once it is passed through the slot, the tab cannot be extracted from the slot. In some embodiments, the slot is positioned in a back cover.

Embodiments may be designed in which the airbag cover cannot move in the axial direction after the airbag cover has been attached to the framework. Other embodiments may be designed in which the airbag cover can move in the axial direction after the airbag cover has been attached to the framework.

The present embodiments also relate to a method for attaching an airbag cover to a steering wheel assembly. The steering wheel assembly is designed to receive an airbag. As part of the method, a steering wheel framework is obtained, wherein the steering wheel framework includes an armature, a first attachment feature, and a back cover. An airbag cover is also obtained. The airbag cover includes a second attachment feature. The method also includes the step of engaging the first attachment feature to the second attachment feature to directly attach the steering wheel framework to the airbag cover without the use of an airbag housing.

In some embodiments, the first attachment feature comprises hooks and the second attachment feature comprises openings, wherein attaching the airbag cover to the framework comprises passing the hooks through the openings. In other embodiments, the first attachment feature is positioned either in the armature or on the back cover, or both. Additional embodiments may be designed in which the first attachment feature is a first opening and the second attachment feature is a second opening, and wherein the assembly further comprises a connector strip having one or more tabs, wherein the tabs are passed through the first opening and the second opening. Yet additional embodiments may be designed in which the first attachment feature comprises a slot and the second attachment feature comprises a tab, wherein the tab is sized such that once it is passed through the slot, the tab cannot be extracted from the slot. In some embodiments, the tab may be a barbed tab or a curved (angled) tab.

The present embodiments relate to a steering wheel assembly that includes an airbag cover. An airbag system is positioned behind the airbag cover. As is known in the art, the airbag cover is designed such that, upon deployment/inflation of an airbag, the airbag will deploy through a tear seam in the cover and become positioned in the vehicle interior. Such positioning of the inflated airbag allows the airbag to protect the vehicle occupant from harmful impact with the steering wheel.

The steering wheel assembly further comprises a steering wheel framework. This framework includes both the steering wheel armature as well as the steering wheel back cover. As known, other features, such as finishers, may also be added to the framework. The steering wheel assembly also has a first attachment feature and a second attachment feature. The first attachment feature is attached to the framework (such as the back cover, the armature, etc.). The second attachment feature is attached to the airbag cover. The first attachment feature is designed to engage the second attachment feature in order to connect the framework to the airbag cover.

In some embodiments, the first attachment feature comprises hooks and the second attachment feature comprises openings. Thus, in this embodiment, the hooks on the framework will engage the openings on the airbag cover to secure the airbag cover to the framework. In other embodiments, the hooks will be added to the armature, finishers, or other portions of the framework.

In other embodiments, the second attachment mechanism comprises a tab that is positioned on the airbag cover. Similarly, the first attachment feature comprises a slot that is added the back cover. The tab is designed and is sized such that once it is passed through the slot, the tab cannot be extracted from the slot.

In other embodiments, the first attachment feature comprises a first opening and the second attachment feature comprises a second opening. In order to secure the first and second attachment features together, a connector strip is then added to the assembly. The connector strip may include one or more tabs. The tabs engage both the first and second attachment features. More specifically, the tabs pass through the openings and cause the first and second attachment features to engage each other and secure the airbag cover.

The steering wheel assemblies of the present embodiments may either be a "fixed" system or a "floating" system. A fixed system is one in which once the airbag cover is attached, the airbag cover cannot move in the axial direction (i.e., up and down in the module assembly). A floating system is designed in which once the airbag cover is attached, the airbag cover can move in the axial direction. Both floating and fixed systems are taught herein.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the present invention, as represented in the Figures, is not intended to limit the scope of the invention, as claimed, but is merely representative of presently preferred embodiments of the invention.

Figure 1:
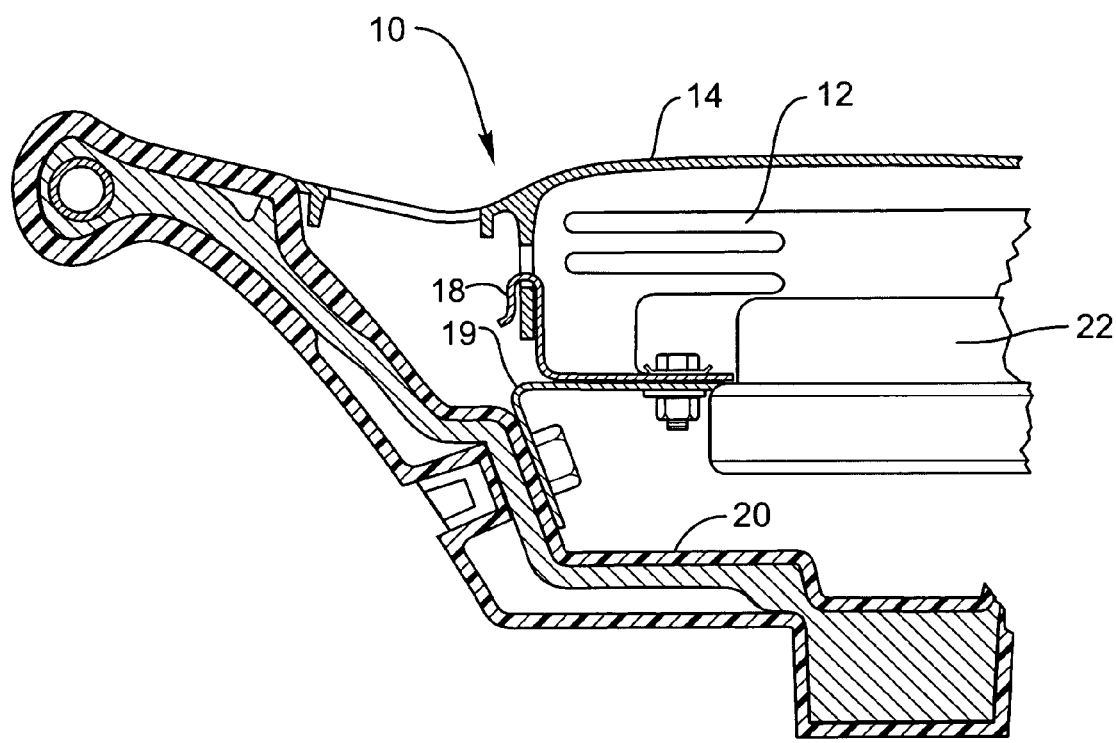
FIG. 1 is a prior art representation of how an airbag module may be attached to a steering wheel.
Figure 2:
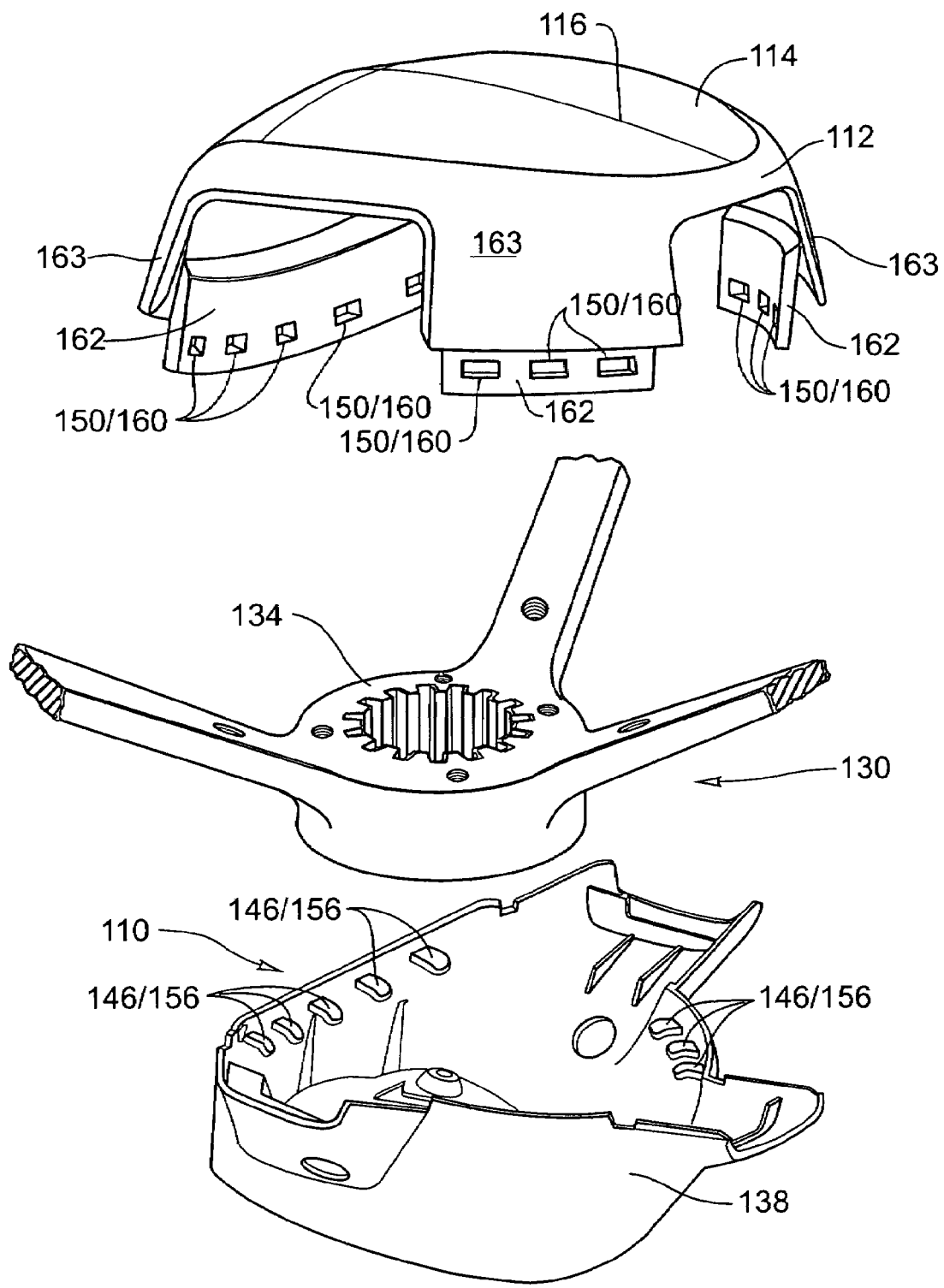
FIG. 2 is an assembly view of a steering wheel assembly according to one present embodiment.

Referring now to FIG. 2, a perspective view illustrates an embodiment of a steering wheel assembly 110 according to the present embodiments. The steering wheel assembly 110 may be used on a vehicle as a means of directing the vehicle. Accordingly, the steering wheel system comprises an airbag cover 112. The airbag cover 112 is designed to cover an airbag 12 (shown in FIG. 1) and may be made of plastic, vinyl, leather, or other similar materials. More specifically, the cover 112 is a covering that will go over the top of an airbag 12 and an inflator 22 (shown in FIG. 1). The cover 112 will generally be positioned proximate the center or hub of the steering wheel. The cover 112 may include a "class A" front surface 114 that is designed to match the interior décor of the vehicle.

As is known in the art, the front surface 114 may include a tear seam 116. The tear seam 116 is a weakened region of the front surface 114 that is designed such that, in the event of an accident or crash, the inflating airbag 12 will tear through the tear seam 116 and the airbag will become positioned on the interior of the vehicle. In some embodiments, the tear seam may be the standard "I-shaped," "H-shaped" or "Y-shaped" seam that will break/separate apart during deployment of the airbag 12. In other embodiments, the cover 112 may have a "clam shell" deployment such that the cover 112 breaks into two or more independent parts during deployment. In further embodiments, the seam 116 may be designed such that the seam 116 defines a large "door" through which the airbag may deploy. If there is only one large "door" in the front surface 114, this configuration may involve having one side of the cover 112 attached securely (as described herein) whereas the attachment on the other sides of the cover 112 is weaker such that these weakened regions will break or pull out without significant resistance. If such a configuration is made, the side attached securely functions as a "hinge" and allows the cover 112 to open.

As can be seen in FIG. 2, the assembly 110 further comprises a steering wheel framework 130. This framework 130 includes both the armature 134 and the steering wheel back cover 138. The armature 134 generally comprises a metal frame that is used as the base and spokes for the steering wheel. The back cover 138 is positioned over the armature 134 to improve the visual appeal and decor of the steering wheel assembly 110. The back cover 138 may be made of plastic, thermoplastic, vinyl, or other similar materials that match the vehicle décor. The back cover 138 may be secured to the armature 134 (such as via fasteners, snap on features, etc.).

The steering wheel assembly 110 further comprises a first attachment feature 146 and a second attachment feature 150. The first attachment feature 146 is attached to the framework 130 (such as the back cover 138, the armature 134, etc.). The second attachment feature 150 is attached to the airbag cover 112. The first attachment feature 146 is designed to engage the second attachment feature 150 in order to connect the framework 130 to the airbag cover 112. In the embodiment shown in FIG. 2, the first attachment feature 146 comprises hooks 156 whereas the second attachment feature comprises openings 160. Thus, in the embodiment shown in FIG. 2, the hooks 156 on the framework 130 will engage the openings 160 on the airbag cover 112. It is this engagement between the hooks 156 and the openings 160 that operate to secure the airbag cover 112 to the framework 130.

It will be appreciated that other embodiments may be constructed in which the first attachment feature 146 does not comprise hooks 156. Rather, another type of feature (such as tabs, interlockers, barbs, etc.) that is capable of engaging the second attachment feature 150 may be used as the first attachment feature 146. Similarly, the second attachment feature 150 is not limited to openings 160. Any structure or feature that is capable of engaging the first attachment feature 146 may be used. Similarly, embodiments may be constructed in which the first attachment feature 146 is an opening, slot, etc. and the second attachment feature 150 is a tab, hook, or other similar feature that engages the opening. Similarly, embodiments may be constructed in which the hooks (or other similar feature) is added to the airbag cover 112 whereas the opening (or feature that engages the hooks) is positioned on the framework 130.

As shown in FIG. 2, the first attachment feature 146 is positioned on the framework 130, and more specifically, on the back cover 138 of the framework 130. Other embodiments may be constructed (as shown herein in FIG. 6) in which the first attachment feature 146 is positioned directly on the armature 134 such that the airbag cover 112 will be secured directly to the armature 134. In such embodiments, the back cover 134 will then be secured to the armature 134 using fasteners, snap on features, etc. It should also be noted that further embodiments may be designed in which the framework 130 comprises finishers and the first attachment feature 146 is added to the finishers. In such embodiments, the airbag cover 112 will be secured directly to the finishers.

As shown in FIG. 2, the second attachment feature 150 may be positioned on one or more flanges 162. The flanges 162 are rearward (interior) of the front surface 114 and are designed to position the second attachment feature 150 such that it will engage the first attachment feature 146. The flanges 162 may also be positioned interior of extensions 163 that likewise extend rearward of the front surface 114. (The extensions 163 may be part of the outer surface (Class A surface) of the airbag cover.) This configuration is given for exemplary purpose only. Other positioning of the second attachment feature 150 is also possible. Other positioning of the first attachment feature 146 is clearly possible. Likewise, the number of first and second attachment features 146, 150 will depend upon the particular embodiment. Of course, the greater the number of features 146, 150 that are used, the stronger the engagement between the airbag cover 112 and the framework 130 will be.

Figure 3:
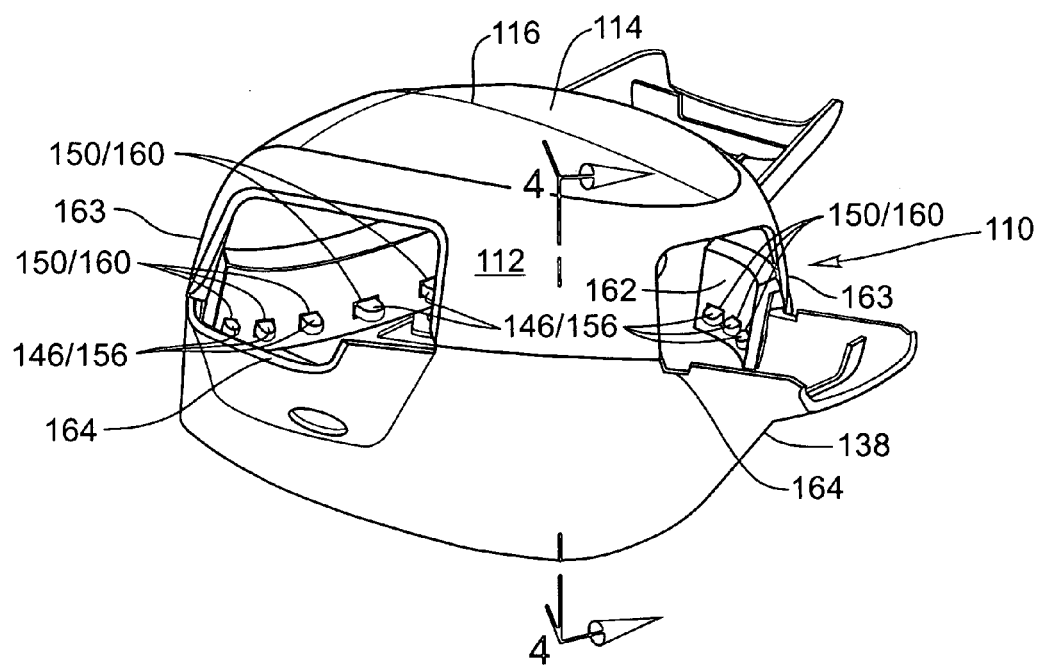
FIG. 3 is a perspective view of the assembly of FIG. 2 shown in its fully assembled configuration.

Referring now to FIG. 3, a perspective view shows the assembly 110 of FIG. 2 in the fully assembled state. In this Figure, the first attachment feature 146 (i.e., the hooks 156) engage the second attachment feature 150 (i.e., the openings 160) to directly secure and attach the airbag cover 112. This attachment of the airbag cover 112 occurs without the use of an airbag housing 18 (shown in FIG. 1).

It should be noted that when the airbag cover 112 is secured as part of the steering wheel assembly 110, at least one spoke aperture 164 is formed. The spoke aperture 164 may be positioned between the flanges 162. This spoke aperture 164 is sized and configured such that one or more of the steering wheel spokes may pass therethrough. Other sizes and configurations for the spoke aperture 164 may also be used.

Figure 4:
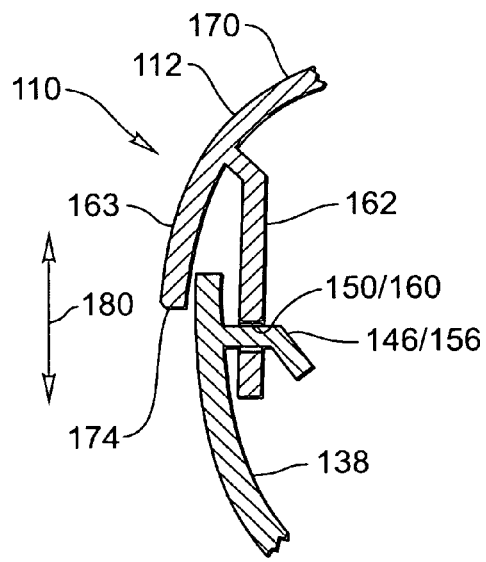
FIG. 4 is a cross-sectional view of FIG. 3 taken along the line 4-4.

FIG. 4 is a cross sectional view that illustrates the engagement between the first attachment feature 146 and the second attachment feature 150. As can be seen in FIG. 4, the flanges 162 are positioned interior of the extensions 163. The first attachment feature 146 engages the second attachment feature 150. Again, in the embodiment shown in FIG. 4, the first attachment feature 146 comprises hooks 156 and the second attachment feature 160 comprises openings 160. The hooks 156 pass through the openings 160. The end of the hooks 156 are bent to prevent the hooks 160 from retracting out of the holes 160—especially during airbag deployment. (Forces will pull upwards in the views shown in the Figures).

As shown in FIG. 4, embodiments may be constructed in which the airbag cover 112 includes a rounded portion 170 proximate the extension 163. The rounded portion 170 is optional and is designed to improve the visual appearance of the airbag cover 112. Other features and shapes may also be used. Likewise the end 174 of the extension 163 may overlap with the back cover 138 as desired.

In the embodiment of FIG. 4, the steering wheel assembly 110 shown can be referred to as a "fixed" assembly in that the airbag cover 112, once attached, cannot move in the axial direction 180 after the airbag cover 112 has been attached to the framework 130 (see FIG. 3). This occurs by having the opening 160 sufficiently sized such that there is no or substantially no clearance between the hook 156 and the opening 160. In this type of "fixed" system, the vehicle horn cannot be activated by simply moving the airbag cover 112 inward in the axial direction. Rather, a separate button or feature must be used to actuate the horn. (Those of skill in the art would appreciate how this type of horn system may be implemented).

Figure 5:
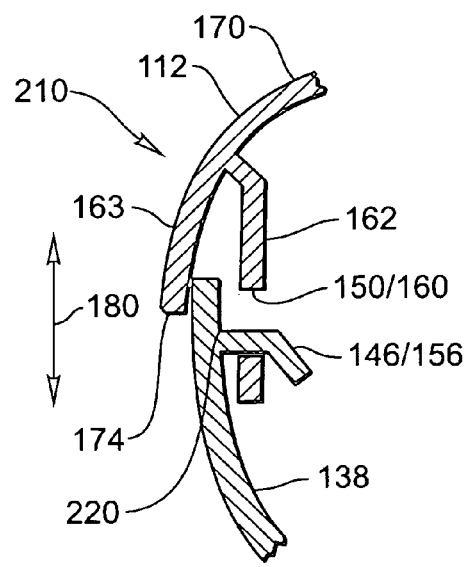
FIG. 5 is a cross-sectional view similar to FIG. 4 which shows another embodiment of a steering wheel assembly.

Referring now to FIG. 5, a cross-sectional view of a second embodiment of a steering wheel assembly 210 is illustrated. The steering wheel assembly 210 is similar to that which is discussed above in conjunction with FIGS. 2-4. Accordingly, for purposes of brevity, the above-recited description will not be repeated. The difference between the steering wheel assembly 210 and the assembly 110 of FIGS. 2-4 is that the assembly 110 is a "fixed" system whereas the assembly 210 is a "floating" system. As shown in FIG. 5, the clearance between the opening 160 and the upper surface 220 of the hooks 156, such that the airbag cover "floats" over the other wheel features. By making the assembly 210 be a "floating" module, the airbag cover 112 can move in the axial direction 180 after the airbag cover 112 has been attached to the framework 130 (see FIG. 3). This floating system allows a vehicle horn system to be constructed such that the horn will actuate when the user pushes inward, or downward, on the airbag cover 112. In other embodiments, the floating system may be a "soft pack" system in which the entirety of the module assembly moves to actuate the horn. Those skilled in the art will appreciate how these types of vehicle horn system may be constructed.

Figure 6:
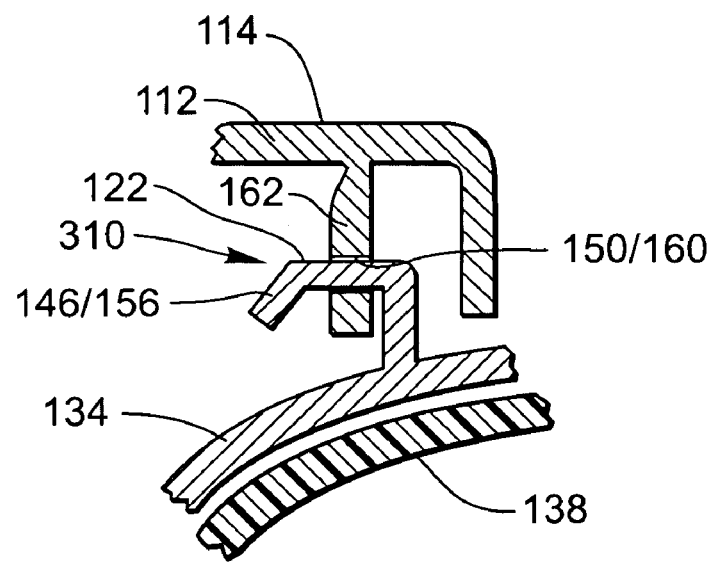
FIG. 6 is a cross-sectional view similar to FIG. 4 which shows another embodiment of a steering wheel assembly.

FIG. 6 is a cross-sectional view of another embodiment of a steering wheel assembly 310. The steering wheel assembly 310 is similar to that which is discussed above in conjunction with FIGS. 2-5. Accordingly, for purposes of brevity, the above-recited description will not be repeated.

The main difference between the embodiment of FIG. 6 and that which was discussed previously is that in FIG. 6 the first attachment feature 146 is added to the armature 134 rather than the back cover 138. In other words, the hooks 156 are positioned directly on the armature 134. The airbag cover 112 comprises the flange 162 with the second attachment feature 150 (i.e. openings 160). However, in this embodiment, when the first and second attachment features 146, 150 are engaged, the airbag cover 112 will be secured directly to the armature 134 without the use of an airbag housing 18 (see FIG. 1). Once the airbag cover 112 is secured directly to the armature 134, the back cover 138 may be secured via fasteners, snap on features, etc. The embodiment described in this paragraph may commonly exist in the spoke areas of the cover and wheel. However, it can also be an added feature to the armature in other areas of the cover.

It should be noted that in the embodiment of FIG. 6, the assembly is a "fixed" module such that there is no opening between the upper surface 122 and the opening 160. Those skilled in the art will appreciate that similar embodiments may have a "floating" assembly constructed in which the airbag cover 112 is secured directly to the armature 134. Still further embodiments may be designed in which the airbag cover 112 is secured directly to finishers that are also part of the framework 130.

Figure 7:
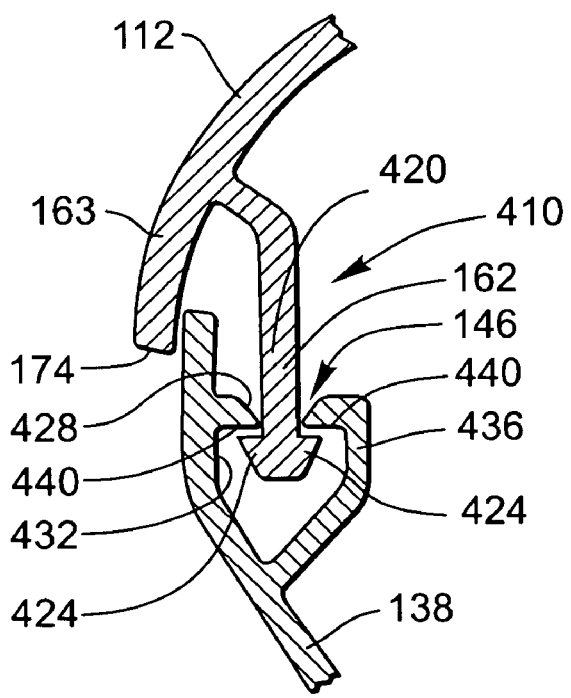
FIG. 7 is a cross-sectional view similar to FIG. 4 which shows another embodiment of a steering wheel assembly.

FIG. 7 is a cross-sectional view of a further embodiment of a steering wheel assembly 410 according to the present embodiments. The steering wheel assembly 410 is similar to that which is discussed above in conjunction with FIGS. 2-6. Accordingly, for purposes of brevity, the above-recited description will not be repeated.

In the above-recited embodiments, the first attachment feature 146 comprises a hook 156 and the second attachment feature 150 comprises openings 160. However, in the embodiment of FIG. 7, the second attachment mechanism 160 comprises a tab 420. The tab 420 may have one or more barbs 424. The tab 420 is positioned on the airbag cover 112. More specifically, the tab 420 is positioned at the end of the flange 162.

In the embodiment of FIG. 7, the first attachment feature 146 comprises a slot 428. The slot 428 is added to the back cover 138. Specifically, the slot 428 may be formed as the opening between the edge 432 of the back cover 138 and an extension piece 436 added to the back cover 138. (The extension piece 436 may be molded directly to the back cover 138 or may be a separately formed piece that is attached via fasteners, welding, etc.). The tab 420 is designed and is sized such that once it is passed through the slot 428, the tab 420 cannot be extracted from the slot 428. To this end, ledges 440 on the edge 432 and/or the extension piece 436 may engage the barbs 424 to ensure that the airbag cover 112 does not separate from the back cover 138.

It should be noted that in the embodiment shown in FIG. 7, slot 428 (i.e., the first attachment feature 146) is positioned on the back cover 138. In other embodiments, the first attachment feature 146 may be added to the armature 134 or the finishers, as described above. Similarly, in the embodiment shown in FIG. 7, the assembly 410 is a "floating" assembly. However, fixed assemblies may also be designed.

Figure 8:
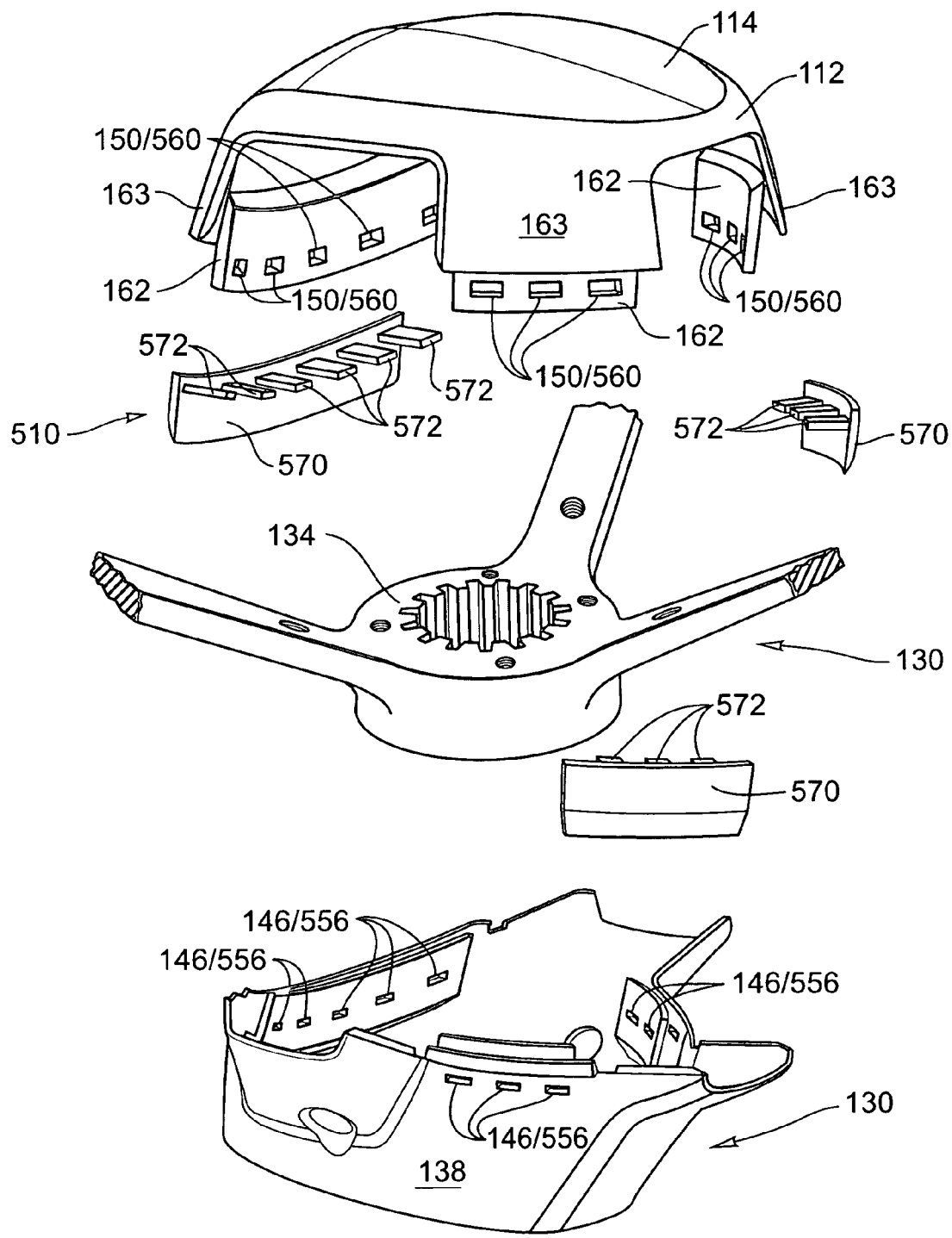
FIG. 8 is a perspective, assembly view similar to FIG. 2 that illustrates another embodiment of a steering wheel assembly.

FIG. 8 is an assembly view of a further embodiment of a steering wheel assembly 510. The assembly view of FIG. 8 is similar to that which is shown in FIG. 2. The steering wheel assembly 510 is similar to that which is discussed above in conjunction with FIGS. 2-7. Like the embodiments discussed above, the second attachment feature 150 that is positioned on the airbag cover 112 comprises an opening 560. (For clarity, this opening 560 may be referred to as a "second opening."). In the embodiment of FIG. 8, the first attachment feature 146 is added to the framework 130 and more specifically, on the back cover 138 of the framework 130. However, the first attachment feature 146 is not a hook, tab, or other similar feature. Rather, in this embodiment, the first attachment feature 146 comprises a first opening 556. Thus both the first and second attachment features 146, 150 comprise openings.

In order to secure the first and second attachment features 146, 150 together, a connector strip 570 is added to the assembly 510. The connector strip 570 may be a visible, decorative, or "class A" piece that is designed to match the decor of the assembly 510. The connector strip 570 may include one or more tabs 572. The tabs 572 engage both the first and second attachment features 146, 150. More specifically, the tabs 572 pass through the openings 556, 560 and cause the first and second attachment features 146, 150 to engage each other and secure the airbag cover 112. In some embodiments, the connector strip 570 may be designed to fit flush with the airbag cover 112. In other embodiments, the connector strip 570 may be designed to cover up gaps, flaws, etc. that is found on the back cover 138, framework 130, airbag cover 112, or other portions of the assembly 510.

Figure 9:
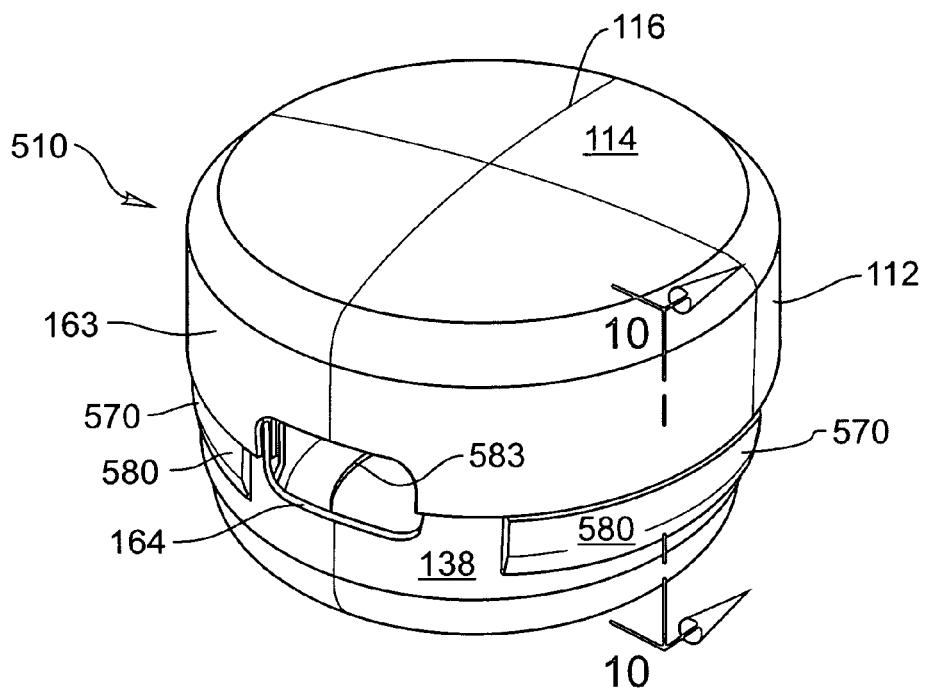
FIG. 9 is a perspective view of the assembly that is similar to the embodiment of FIG. 8, the assembly of FIG. 9 being shown in its fully assembled configuration.

FIG. 9 is a perspective view of an assembly 510 that is similar to the assembly of FIG. 8. This assembly is shown in its fully assembled configuration. As can be seen in FIG. 9, the top surface 580 of the connector strip 570 is visible to the consumer when the connector strip 570 attaches the first and second attachment features 146, 150.

As shown in FIG. 9, the assembly 510 includes an aperture 164 that is sized and designed to receive a steering wheel spoke. The back cover 138 may also have an opening 583 so that the back cover 138 may engage the hub or other portions of the armature 134.

Figure 10:
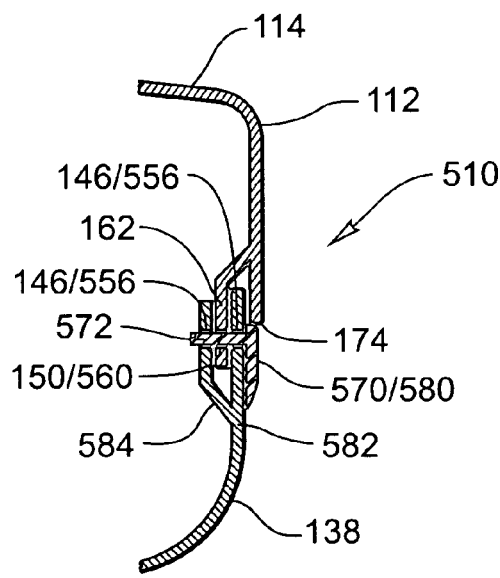
FIG. 10 is a cross-sectional view of the embodiment of FIG. 9 taken along the line 10-10.

FIG. 10 is a cross-sectional view taken along the line 10-10 of FIG. 9. The view shown in FIG. 10 is similar to that which is shown and described in conjunction with FIG. 4. FIG. 10 shows the engagement between the first and second attachment features 146, 150. As described above, the first and second attachment features 146, 150 constitute openings 556, 560 that are engaged together by having the tabs 572 pass through the openings 556, 560. As can be seen in FIG. 10, the back cover 138 includes an outer surface 582 and an extension 584. There is an opening between the outer surface 582 and the extension 584 into which the flange 162 may fit. The top surface 580 of the connector strip 570 is positioned exterior of the outer surface 582 and passes through the openings in the outer surface 582, the flange 162, and the extension 584.

It is readily apparent that the embodiment of FIG. 10 shows the airbag cover 112 can be secured to the back cover 138. However, other embodiments may (as described above) be designed in which the airbag cover 112 is secured to the armature 134 or other portions of the framework 130. Of course, in order to accomplish this, the first attachment feature 146 may be moved from the back cover 138 to the armature 134, etc. Those skilled in the art will appreciate how this may be accomplished.

Figure 11:
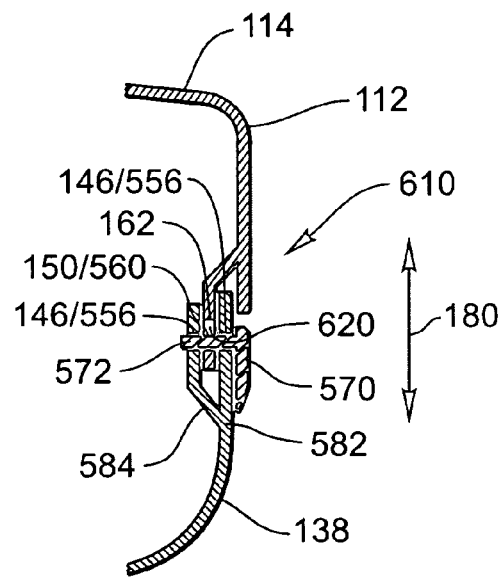
FIG. 11 is a cross-sectional view similar to FIG. 9 which shows another embodiment of a steering wheel assembly.

In the embodiment shown in FIG. 10, the assembly 510 is a "fixed" assembly such that the airbag cover 112 cannot move in the axial direction 180 after the airbag cover 112 has been attached to the framework 130. However, those skilled in the art will appreciate that the assembly 510 may be designed to be a "floating" assembly. Specifically, FIG. 11 is a cross-sectional view that illustrates how this may be accomplished. FIG. 11 discloses a steering wheel assembly 610 that is similar to the assembly 510, except that the assembly 610 is a "floating" system rather than a fixed system.

In order to construct the floating module, a gap 620 is formed between the airbag cover 112 and the connector strip 570. This gap 620 means that the airbag cover 112 "floats" over the other wheel features. By making the assembly 610 as a "floating" module, the airbag cover 112 can move in the axial direction 180 after the airbag cover 112 has been attached to the framework 130. This floating system allows a vehicle horn system to be constructed such that the horn will actuate when the user pushes inward on the airbag cover 112. In other embodiments, the floating system may be a "soft pack" system in which the entirety of the module assembly moves to actuate the horn. Those skilled in the art will appreciate how these types of vehicle horn system may be constructed.

Referring now generally to all of the Figures, those skilled in the art will appreciate that the present embodiments also relate to a method for attaching an airbag cover 112 to a steering wheel assembly. This steering wheel assembly may be any of the assemblies described herein, including assembly 110, 210, 310, 410, 510, or 610. The steering wheel assembly is designed to receive an airbag 12. As part of the method, a steering wheel framework 130 is obtained, wherein the steering wheel framework 130 includes an armature 134, a first attachment feature 146, and a back cover 138. An airbag cover 112 is also obtained. The airbag cover 112 includes a second attachment feature 150. The method also includes the step of engaging the first attachment feature 146 to the second attachment feature 150 to directly attach the steering wheel framework 130 to the airbag cover 112 without the use of an airbag housing 18.

In some embodiments, the first attachment feature 146 comprises hooks 156 and the second attachment feature 150 comprises openings 160, wherein attaching the airbag cover 112 to the framework 130 comprises passing the hooks 156 through the openings 160. In other embodiments, the first attachment feature 146 is positioned either on the armature 134 or on the back cover 138. Additional embodiments may be designed in which the first attachment feature 146 is a first opening 556 and the second attachment feature 150 is a second opening 560, and wherein the assembly further comprises a connector strip 570 having one or more tabs 572, wherein the tabs 572 are passed through the first opening 556 and the second opening 560. Yet additional embodiments may be designed in which the first attachment feature 146 comprises a slot 428 and the second attachment feature 150 comprises a tab 420, wherein the tab 420 is sized such that once it is passed through the slot 428, the tab 420 cannot be extracted from the slot 428.

Referring still to all of the Figures generally, some advantages of the present embodiments will be described. Specifically, by having the airbag cover secured directly to the framework, the present embodiments may have better gap control (i.e., control/covering of the gaps between the airbag cover and steering wheel spokes). Accordingly, the visual appearance of the system increases. Further, the present embodiments reduce or eliminate the tolerance stack-up from cover attachment to the housing. The present embodiments also may reduce the weight, cost, and complexity of the system by eliminating the airbag housing. Further, without the housing, the area to pack the airbag is increased, thereby increasing the design options to pass out-of-position ("OOP") test requirements because the deployment area and doors can be much larger. The present design may also allow secondary deployment paths if an OOP occupant is blocking the front of the cover. The airbag can be protected from snagging on wheel cavity features by using an appropriately designed fabric wrap of the folded cushion.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A steering wheel assembly for receiving an airbag comprising:
   a steering wheel framework comprising a back cover and a first attachment feature; and
   an airbag cover having a second attachment feature for engaging the first attachment feature to directly attach the airbag cover to the steering wheel framework without the use of an airbag housing.

2. A steering wheel assembly as in claim 1 wherein the first attachment feature comprises hooks and the second attachment feature comprises openings, wherein the airbag cover is attached by passing the hooks through the openings.

3. A steering wheel assembly as in claim 2 wherein the first attachment feature is positioned on the back cover.

4. A steering wheel assembly as in claim 2 wherein the framework further comprises an armature, wherein the first attachment feature is positioned on the armature.

5. A steering wheel assembly as in claim 1 wherein the first attachment feature is one or more first openings and the second attachment feature is one or more second openings, wherein each first opening corresponds to one of the second openings, and wherein the assembly further comprises a connector strip having one or more tabs, wherein each tab is passed through one of the first openings and one of the second openings.

6. A steering wheel assembly as in claim 1 wherein a spoke aperture is formed when the airbag cover is secured.

7. A steering wheel assembly as in claim 1 wherein the first attachment feature comprises a slot and the second attachment feature comprises a tab, wherein the tab is sized such that once it is passed through the slot, the tab cannot be extracted from the slot.

8. A steering wheel assembly as in claim 7 wherein the slot is positioned in a back cover.

9. A steering wheel assembly as in claim 1 wherein the airbag cover cannot move in the axial direction after the airbag cover has been attached to the framework.

10. A steering wheel assembly as in claim 1 wherein the airbag cover can move in the axial direction after the airbag cover has been attached to the framework.

11. A method for attaching an airbag cover to a steering wheel assembly, the steering wheel assembly being designed to receive an airbag, the method comprising:
    obtaining a steering wheel framework, the steering wheel framework including a first attachment feature, and a back cover;
    obtaining an airbag cover having a second attachment feature; and
    engaging the first attachment feature to the second attachment feature to directly attach the airbag cover to the steering wheel framework without the use of an airbag housing.

12. A method as in claim 11 wherein the first attachment feature comprises hooks and the second attachment feature comprises openings, wherein attaching the airbag cover to the framework comprises passing the hooks through the openings.

13. A method as in claim 12 wherein the framework further comprises an armature, wherein the first attachment feature is positioned either on the armature or on the back cover.

14. A method as in claim 11 wherein the first attachment feature is a first opening and the second attachment feature is a second opening, and wherein the assembly further comprises a connector strip having one or more tabs, wherein the tabs are passed through the first opening and the second opening.

15. A method as in claim 11 wherein the first attachment feature comprises a slot and the second attachment feature comprises a tab, wherein the tab is sized such that once it is passed through the slot, the tab cannot be extracted from the slot.

16. A steering wheel assembly for receiving an airbag comprising:
    a steering wheel framework comprising a back cover and a first attachment feature; and
    an airbag cover having a second attachment feature for engaging the first attachment feature to directly attach the airbag cover to the steering wheel framework without the use of an airbag housing, wherein at least one of the attachment features is either an opening or a slot.

17. A steering wheel assembly as in claim 16 wherein both the first and second attachment features are openings.

18. A steering wheel assembly as in claim 16 wherein the first attachment features is a slot.

* * * * *